INVENTOR
John W. Scully
BY Robert R. Churchill
ATTORNEY

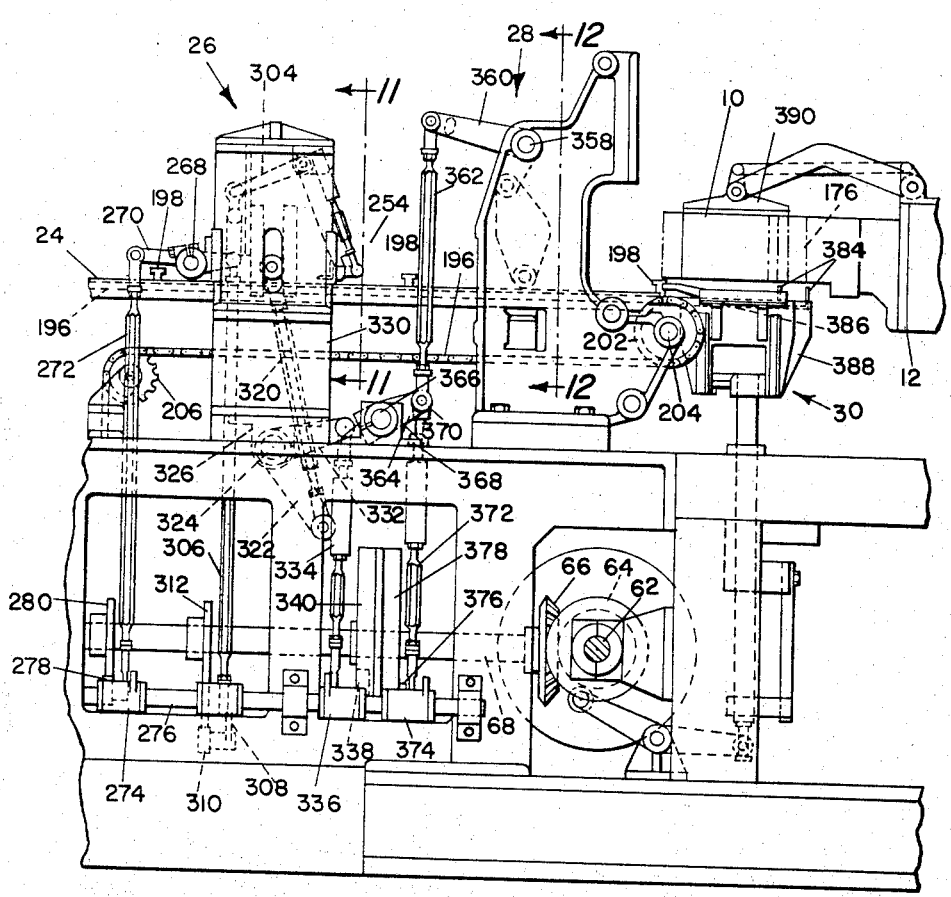
Fig. I-A

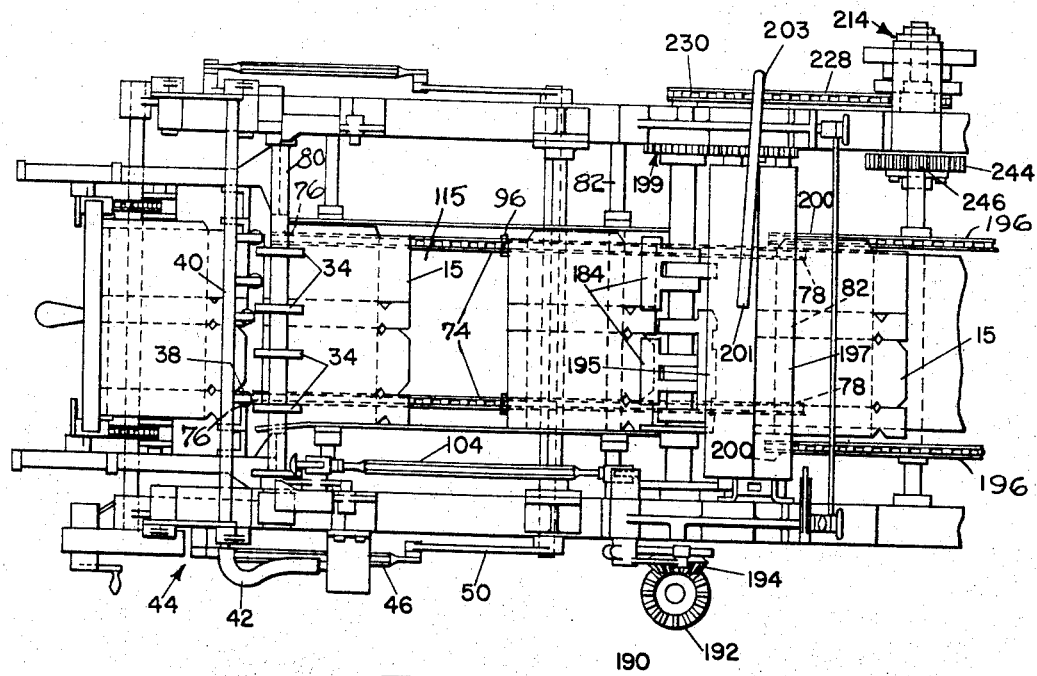
Fig. 2
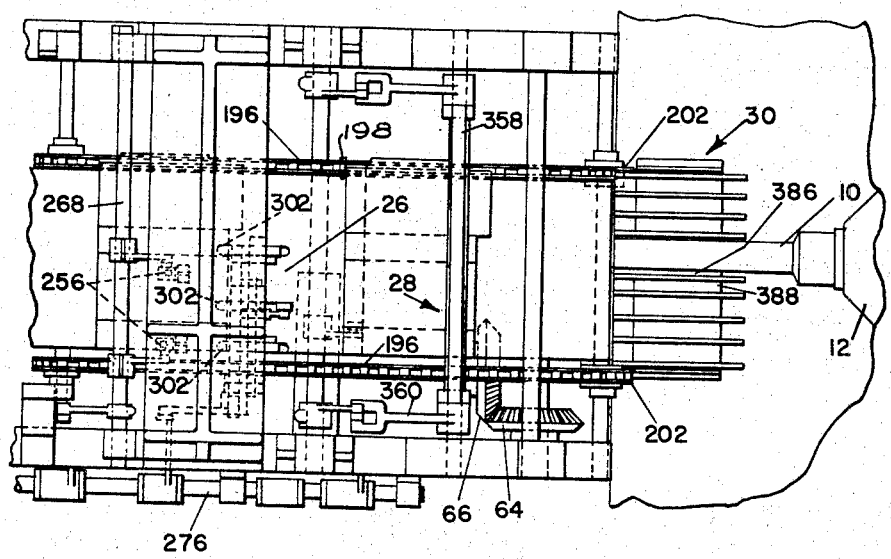
Fig. 2-A

Oct. 29, 1968  J. W. SCULLY  3,407,712
CARTON FORMING MACHINE
Filed Jan. 20, 1967  13 Sheets-Sheet 12

INVENTOR
John W. Scully
BY Robert Churchill
ATTORNEY

Oct. 29, 1968     J. W. SCULLY     3,407,712
CARTON FORMING MACHINE

Filed Jan. 20, 1967     13 Sheets-Sheet 13

INVENTOR
John W. Scully
BY
Robert R. Churchill

ATTORNEY

United States Patent Office 3,407,712
Patented Oct. 29, 1968

3,407,712
CARTON FORMING MACHINE
John W. Scully, Raynham, Mass., assignor to Pneumatic Scale Corporation, Quincy, Mass., a corporation of Massachusetts
Filed Jan. 20, 1967, Ser. No. 610,660
12 Claims. (Cl. 93—49)

This invention relates to a carton forming machine and more particularly to a machine for forming a carton adapted to provide a hinged top closure.

The invention has for an object to provide a novel and improved carton forming machine having novel provision for handling and folding a prescored carton blank of the type adapted to provide a hinged top closure and for advancing the folded blank into registered relation to a forming block about which the blank is wrapped to form the carton in an efficient and economical manner.

With this general object in view and such others as may hereinafter appear, the invention consists in the carton forming machine and in the various structures, arrangements and combinations of parts hereinafter described and particularly defined in the claims at the end of this specification.

In the drawings illustrating the preferred embodiment of the invention:

FIGS. 1 and 1A taken together comprises a side elevation of a sufficient portion of a carton forming machine embodying the present invention to enable the invention to be understood;

FIGS. 2 and 2A taken together comprise a plan view of the carton forming machine shown in FIGS. 1 and 1A;

Figure 1:
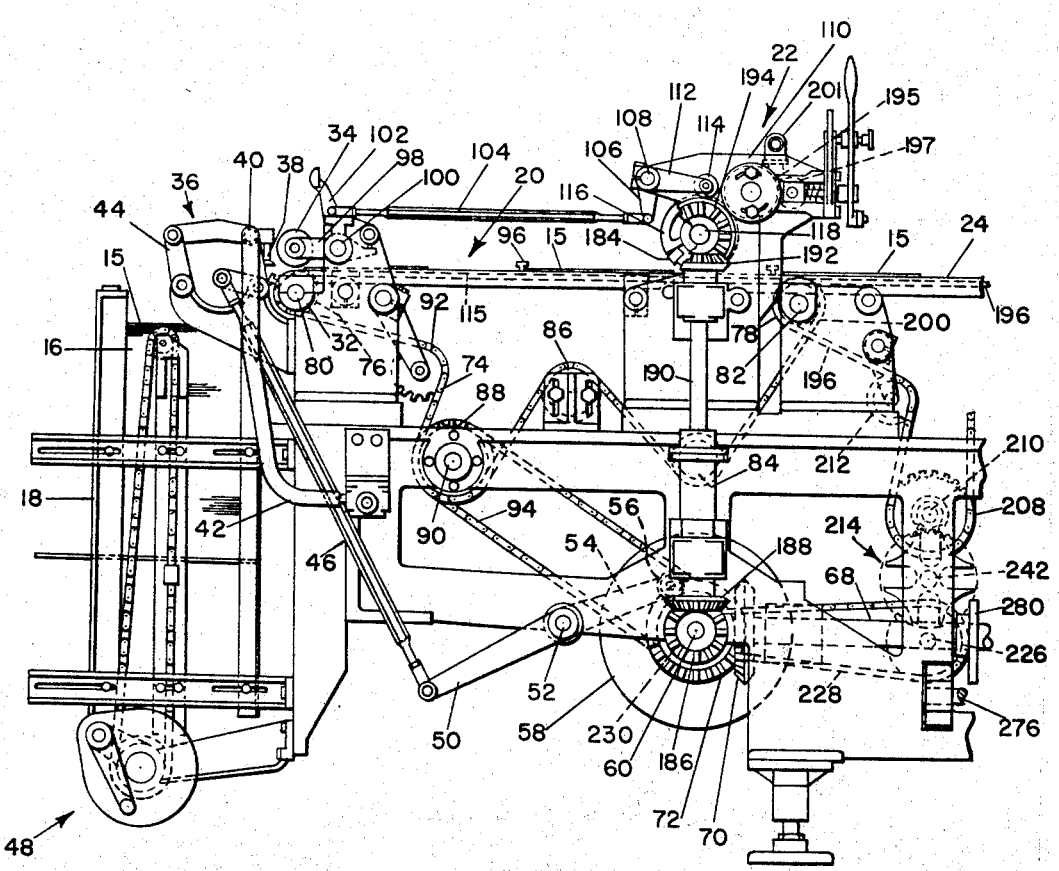

In general, the present invention is shown as embodied in a carton forming machine of the type illustrated and described in the United States patent to Vergobbi, No. 2,364,406, wherein successive flat prescored carbon blanks are transferred from a stack thereof onto a conveyer which advances the blanks through adhesive applying mechanism for applying adhesive to selected areas thereof, and wherein the blank is then advanced into registered position beneath one of a plurality of intermittently movable horizontal and radially extended forming blocks. Thereafter, the blank is wrapped about the forming block and provided with a side seam to form a rectangular tube with it bottom closing flaps extended beyond the end of the forming block. At a succeeding station of operation, the bottom closing flaps are folded into overlapping relation and sealed to provide the bottom closure whereupon the carton is removed from the forming block and turned to an upright position in readiness to be filled and top closed on succeeding machines in the line of packaging machines.

The present invention contemplates a carton forming machine particularly adapted for handling prescorded carton blanks for forming cartons having a hinged end closure, such as the carton illustrated and described in the copending application of John G. Vergobbi, Ser. No. 327,464, filed Dec. 2, 1963, now Patent No. 3,282,492, issued Nov. 1, 1966, and assigned to the present assignee. This carton was particularly designed to be economically produced on a high speed carton forming machine, and one of the steps in the preparation of the hinged end closure comprises the step of folding a part of the top closing or cover forming portion of the flat blank downwardly and then upwardly along scored lines to provide a two ply band or side wall for the cover forming portion prior to wrapping the blank about the forming block.

In accordance with the present invention the carton forming machine has been modified to provide novel mechanism to perform the folding operation in the flat blank to form the two ply band prior to wrapping the blank about the forming block. In operation, a carton blank transferred from the stack onto a first conveyer is continuously advanced through adhesive applying mechanism and thereafter the blank is advanced onto an intermittently operated conveyer so that the blank is at rest during the blank folding operation.

Prior to the present invention the conveyer for advancing successive blanks through the adhesive applying mechanism was driven continuously and extended to a point spaced from the forming block where the blank was engaged by feed rolls for rapidly advancing the blank under the block whereupon a cam operated pusher member engaged the trailing end of the blank to push it into registered position beneath the forming block to be folded thereabout. One of the features of the present invention resides in the provision for advancing the blank along the intermittently operated conveyer directly into registered position beneath the forming block in timed relation to the movement of the intermittently movable forming blocks, thus eliminating the need for the rapid advance feed rolls and the pusher mechanism.

Another feature of the invention resides in the provision of a modified Geneva drive for the intermittent conveyer whereby to provide a harmonic motion affording smoother transfer movement than the conventional Geneva indexing movement, thus providing better control in moving the blank into and out of registered position to the folding mechanism for forming the two ply fold or band and also to better control the movement of the blank into registered position beneath the forming block.

It will be understood that the operations of wrapping the blank about the forming block to form a tube and subsequently forming the bottom closure are performed in a conventional manner modified to accommodate the two ply cover forming band in the blank. It will also be understood that the carton having a two ply cover forming band and stripped from the forming block is provided with upstanding closing flaps at its open end ready to be filled and top closed on succeeding machines, the top closing operations completing the formation of the hinged end closure.

Referring now to the drawings, the present invention is illustrated as embodied in a carton forming machine of the type provided with a plurality of radially extended horizontal forming blocks indicated generally at 10, the forming blocks being secured to a hub 12 mounted on and rotated intermittently with a central shaft, not shown, of the carton forming machine to present the forming blocks to successive stations of the machine. Inasmuch as machines of this type which are provided with mechanisms for wrapping a prescored carton blank about a forming block to provide a rectangular carton having a bottom closure and open at its mouth are well known in the packaging trade, only sufficient portions of the machine have been therein illustrated and will be hereinafter described as will enable the present invention to be understood, reference being made to the United States patent to Vergobbi, No. 2,364,406.

In general, in the illustrated embodiment of the invention, the prescored carton forming blanks 15, herein shown as having prescored top closing flap portions adapted to provide a hinged top closure, are arranged to be withdrawn from a stack 16 stored in a magazine 18 and transferred to a continuously operated conveyor 20 to be conveyed into operative relation to adhesive applying mechanism indicated generally at 22 for applying adhesive to selected areas of the blank including those portions of the blank to be folded prior to wrapping the blank about the forming block. The continuously advanced blank provided with adhesive is then transferred to a second conveyor coextensive with the first conveyor and which comprises an intermittently operated conveyor indicated generally at 24, the blank coming to rest in operative relation to blank folding and pressing mechanism indicated generally at 26. The blank is then advanced one station into operative relation to a second pressing station, indicated generally at 28, whereupon the blank is intermittently moved onto an elevating support indicated at 30 in registered position to be wrapped about its forming block 10.

As herein shown, the uppermost carton blank 15 in the stack 16 is inserted between feed rolls 32, 34 by suction transfer means 36 arranged to lift the uppermost blank upwardly and forwardly to present the leading edge of the blank between the feed rolls. The suction transfer means 36 may be of a known type herein shown as including a plurality of suction cups 38 carried by a hollow pipe 40 connected to a source of suction through a flexible hose 42 as indicated. The pipe 40 is carried by parallel linkage 44 arranged to be operated from the container forming machine through connections including a cam operated link 46 adapted to rock the parallel linkage 44 to effect the transfer operation. The stack of blanks 16 may be kept at a constant level in the magazine by known elevating mechanism generally indicated at 48 and which operates to elevate the stack periodically to compensate for the withdrawn blanks. As illustrated, the link 46 is connected to an arm 50 fast on a rocker shaft 52 and a second arm 54 also fast thereon is provided with a cam roll 56 for cooperation with a cam 58 fast on a cam shaft 60. The cam shaft 60 is driven from a main cam shaft 62 of the carton forming machine by connections including bevel gears 64, 66, the latter being fast on one end of an elongated cam shaft 68. The other end of the shaft 68 is provided with a bevel gear 70 in mesh with a bevel gear 72 fast on the cam shaft 60.

The continuously operated conveyor 20 comprises a pair of spaced endless chains 74 arranged to run over sprockets 76, 78 mounted on shafts 80, 82 at the receiving and delivery ends, respectively, of the conveyor. From the delivery end of the conveyor, the chains run around idler sprockets 84, 86, then under a drive sprocket 88 fast on a shaft 90 and over an idler sprocket 92 back to the receiving end of the conveyor. The shaft 90 is connected to the cam shaft 60 by a chain and sprocket drive 94. The conveyor chains 74 are provided with spaced pusher fingers 96 arranged to engage the rear edges of successive carton blanks 15 transferred thereto, and the feed rolls 32, 34 are arranged to effect advance of the blank onto the conveyer in timed relation to the movement thereof to permit engagement of the rear edges of successive blanks by successive pairs of fingers 96 as the chains travel around the sprockets at the receiving end of the conveyor. The lower feed roll 32 is mounted to rotate with the shaft 80. The upper feed roll 34 comprises an idler roll carried between arms 98 fast on a rocker shaft 100 and is arranged to be rocked upwardly each cycle of operation to permit entrance of the leading edge of the blank presented thereto by the transfer mechanism and to be rocked down into cooperative engagement with the driven roller 32 to effect advance of the blank into operative position to be engaged by the fingers 96 of the chains 74. As herein shown, the rocker shaft 100 is provided with an arm 102 fast thereon connected by a link 104 to an arm 106 fast on a shaft 108 supported in a bracket 110 attached to the machine frame. The shaft 108 is also provided with an arm 112 having a cam roll 114 for cooperation with a cam 116 fast on a driven shaft 118 which may comprise the adhesive applying member shaft to be described.

Figure 3:
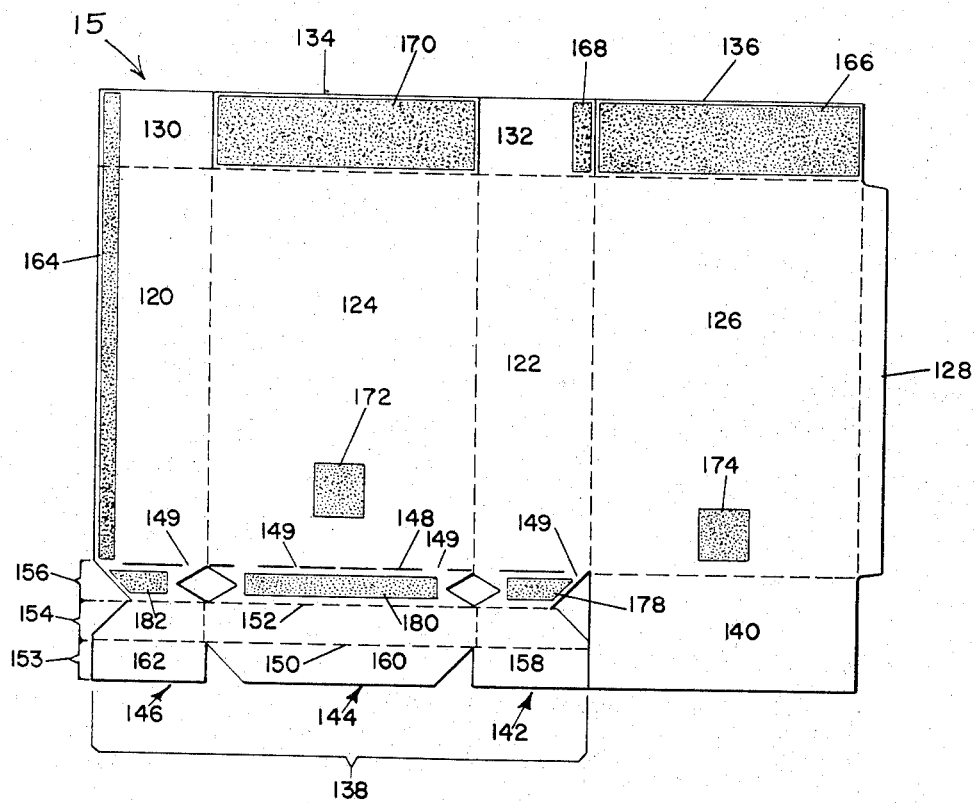
FIG. 3 is a developed view of a prescored carton blank adapted to provide a hinged top closure.

The prescored carton blank deposited on the continuous conveyer 20 and engaged by the fingers 96 is advanced along a stationary elongated supporting plate 115 into operative relation to the adhesive applying mechanism 22 where adhesive is applied to selected areas of the blank during the continuous movement of the blank therethrough. As shown in FIG. 3, the carton blank 15 is provided with end wall panels 120, 122 and side wall panels 124, 126 forming the body portion of the carton and which are defined by prescored lines, a side seam flap 128 being connected to the side wall panel 126 as shown. One end of the blank is provided with bottom closing flaps comprising end flaps 130, 132 extending from the end wall panels 120, 122, respectively, and side flaps 134, 136 extending from the side wall panels 124, 126, respectively. The top closing portions of the illustrated carton blank include an integral three-section portion 138 connected to the body panels 120, 124, 122, which portion is adapted to be folded to form the three sides of the hinged cover fitted about the upper end of the body portion in the completed carton. The top closure further includes a side flap 140 hingedly connected to the side wall panel 126 and which comprises the last folded flap of the hinged cover.

As herein shown, the three-section cover forming portion 138 comprises integral sections 142, 144, 146 extending from the body panels 122, 124, 120, respectively, and connected together by prescored lines. The cover forming portion 138 is connected to the body panels along a weakened score line 148 which is provided with elongated spaced slits leaving relatively small frangible connecting portions 149 between the body panels and the integral cover forming portion 138. The integral cover forming portion 138 is also provided with two spaced transverse score lines 150, 152 providing elongated transverse sections 153, 154, 156. In practice, section 156 is folded downwardly along line 148, and section 154 is folded upwardly along line 152 to form two-ply side walls 157 for the cover portion which extend about the top of the body portion in the subsequently formed carton and leaving relatively short flaps 158, 160, 162 in the transverse section 153 extending from the two-ply portion in the folded carton blank.

While the carton blank is still in its developed form, as shown in FIG. 3, and prior to the transverse sections 154, 156 being folded one upon another, adhesive is applied to the blank, as indicated, including a narrow strip of adhesive 164 along the marginal area of the end wall panel 120 for sealing the same to the side seam flap 128. As illustrated, the strip 164 extends beyond the panel 120 onto the bottom closure flap 130. The remaining bottom closing flaps are provided with adhesive coated areas 166, 168, 170 as shown. Relatively small adhesive coated areas 172, 174 are also provided on the side wall panels 124, 126, respectively, for adhering the blank to a lining blank previously wrapped about the forming block 10 at preceding stations of the carton forming machine, the lining on the forming block being indicated at 176 in FIG. 1A. The transverse section 156 of the cover forming portion 138 is provided with adhesive coated areas 178, 180 and 182 for sealing the same to the transverse section 154 upon folding of the sections one upon the other to form the two-ply side walls 157.

Figure 5:
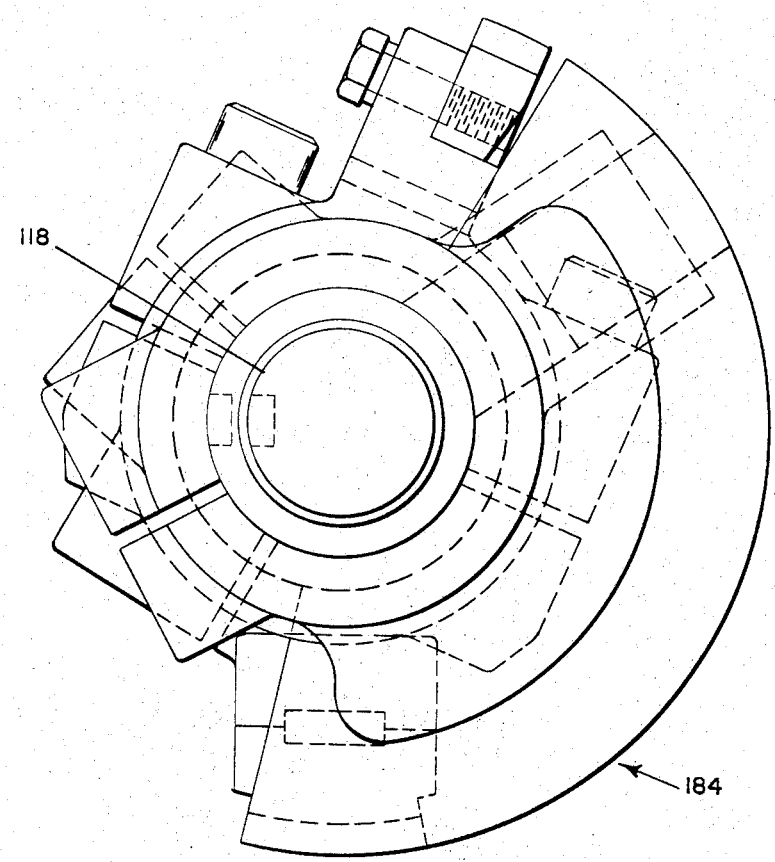
FIG. 5 is an end view detail of a segmental adhesive applying member.

As illustrated in FIG. 1, the adhesive applying mechanism 22 includes a segmental adhesive applying member 184 fast on the shaft 118. The segmental applying member 184 is provided with a plurality of radial segmental applying sections, as shown in FIG. 5, which are spaced apart laterally and circumferentially and are of the required area to provide the adhesive areas indicated on the blank during the continuous movement of the blank and rotation of the applying member. In practice, the applying member 184 may be of a radius such as to have a surface speed slightly greater than the linear speed of the conveyer 20 in order that the blank may be pulled forward a short distance from the pusher fingers 96 of the conveyer chains whereby to prevent jamming or buckling of the blank between the applying member and the fingers when the blank is engaged by the applying member. As herein shown, the shaft 118 may be driven from the cam shaft 60 through bevel gears 186, 188 connecting the shaft 60 to a vertical shaft 190 and through bevel gears 192, 194 connecting the shaft 190 to shaft 118. As herein shown, adhesive is supplied to the segmental applying member 184 by a transfer roll 195 which cooperates with a supply roll 197, the rolls being connected together by a gear train as indicated at 199 in FIG. 2. The adhesive is deposited between the rolls 195 and 197 by a nozzle 201 connected to a pipe 203 leading from a supply tank, not shown, the surplus adhesive being returned to the tank and recirculated in a known manner.

After passing through the adhesive applying mechanism 22, the continuously moving blank is transferred to the intermittently operated conveyer 24 which may also comprise a pair of laterally spaced endless chains 196 having a plurality of longitudinally spaced pusher fingers 198. As illustrated in FIGS. 1 and 1A, the chains 196 run over idler sprockets 200 loosely mounted on the shaft 82 comprising the same shaft on which the sprockets 78 of the continuously operated conveyer are mounted. The upper runs of the intermittently movable chains 196 extend from sprockets 200 to sprockets 202 mounted on the shaft 204 at the delivery end of the conveyer. The lower runs of the chains extend from the sprockets 202 over idler sprockets 206 and under and around drive sprockets 208, the latter being fast on a shaft 210. The chains then extend over idler sprockets 212 and back to the sprockets 200 at the receiving end of the intermittently operated conveyer.

Figure 13:
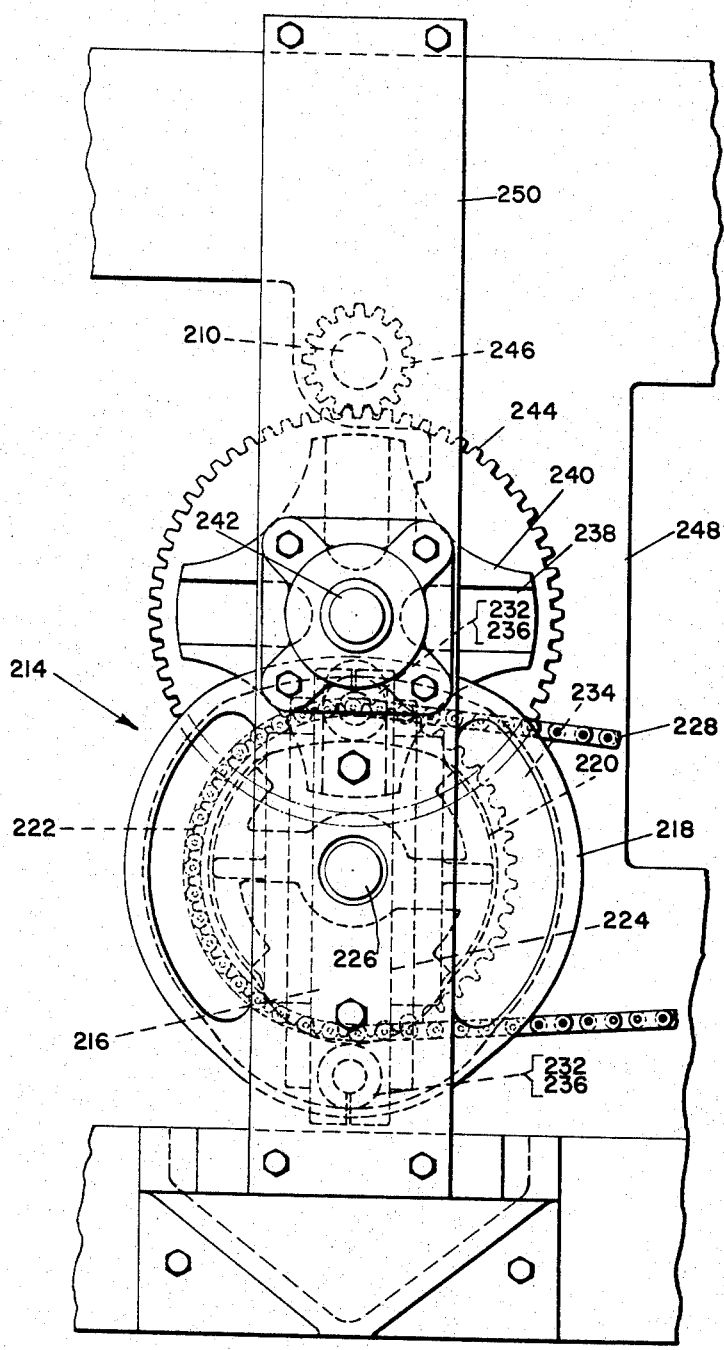
FIG. 13 is a detail view in front elevation of a modified Geneva drive for the intermittent conveyer.
Figure 14:
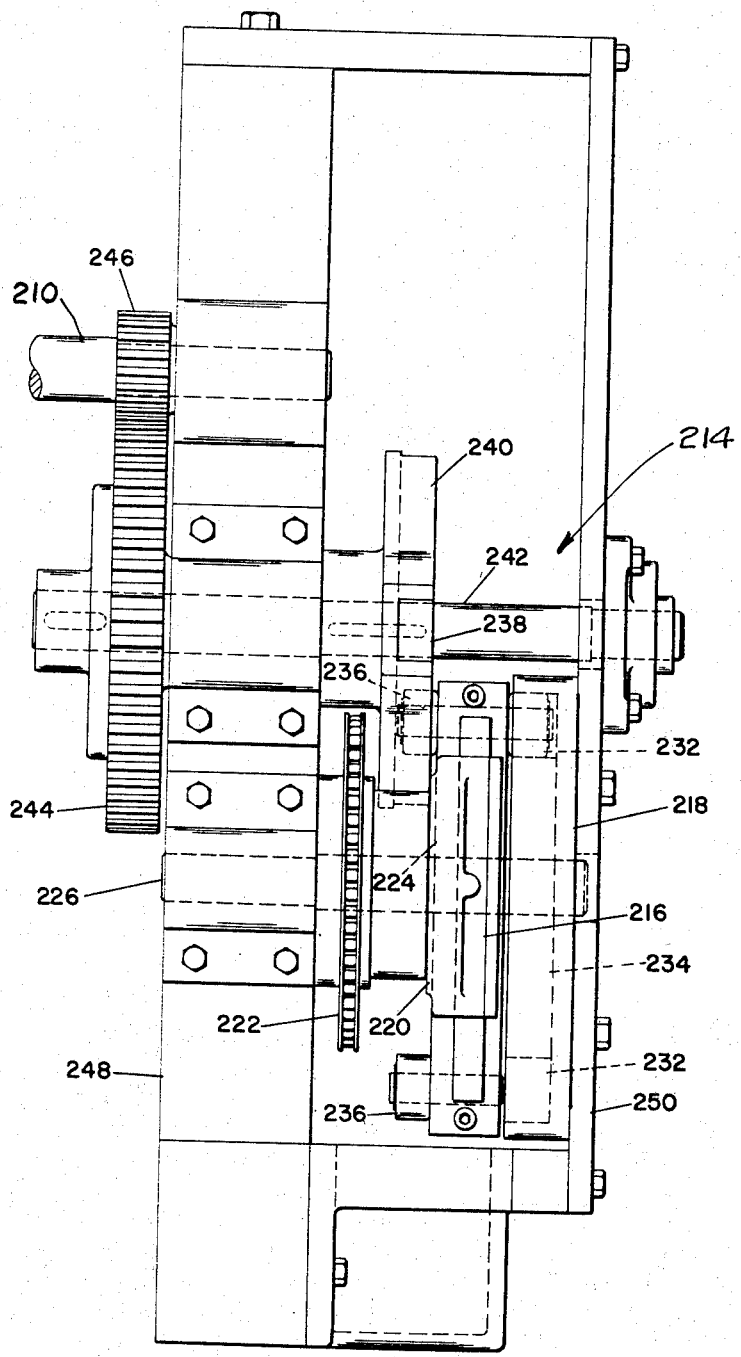
FIG. 14 is a side elevation of the drive shown in FIG. 13.

The shaft 210 is arranged to be rotated intermittently through a modified motion Geneva drive indicated generally at 214. As illustrated in FIGS. 13 and 14, the modified motion Geneva drive includes a driving element 216 comprising a slide bar interposed between a stationary cam 218 and the hub 220 of a sprocket 222 and mounted to be reciprocated radially in a diametrically grooved portion 224 formed in the end of the hub 220. The sprocket 222 is mounted to rotate on a shaft 226 and is connected by a chain 228 to a sprocket 230 fast on the cam shaft 60. The driving element 216 is provided with diametrically opposed rollers 232 on one side thereof and which cooperate with a cam path 234 in the stationary cam 218. Similar opposed driving rollers 236 aligned with the rollers 232 extend from the other side of the driving element 216 and are arranged to cooperate with the slots 238 of a four point Geneva driven element 240 fast on a shaft 242. Also fast on the shaft 242 is a gear 244 which meshes with a pinion 246 fast on the conveyer drive shaft 210. As illustrated in FIG. 14, the modified Geneva mechanism 214 is supported in a side frame member 248 and by an upright supporting member 250 to which the stationary cam 218 is bolted.

In operation the opposed rollers 232 on one side of the diametrically reciprocable driving element 216 are guided in the cam path 234 to follow a harmonic motion path wherein the driving rollers 236 are caused to enter the slots 238 of the driven element 240 at a time when opposed drive rollers 236 are equidistant from the center of the shaft 226, that is, the rollers 236 are on the same radius, and during the continued rotation and radial movement of the reciprocable element 216, the roller engaged with the slot is moved harmonically to pass through a progressively decreasing radius or distance from the center of the shaft 226 through the first half of its ninety degree movement in driving engagement with the slot. Conversely, during the second half of its ninety degree movement, the roller is moved harmonically to pass through a progressively increasing radius from the center of the shaft. As a result, the intermittent movement of the conveyer is smoothed out to provide a more uniform acceleration and deceleration so as to better control the movement of the blank into operative relation to the operating stations associated with the conveyer. In other words, the maximum rate of movement of the conveyer when the drive roller is passing through its halfway point is less than the maximum speed produced by a conventional Geneva drive.

The intermittently operated conveyer 24 is moved in timed relation to the continuously operated conveyer 20 in a manner such that successive blanks 15 delivered to the conveyer 24 are disposed to be engaged by the pusher fingers 198. The first advancing movement disposes a blank in registered position to the folding and pressing mechanism 26. As illustrated in detail in Fig. 6, the mechanism 26 includes a pair of holding or clamping members 252 arranged to engage spaced portions of the body of the blank when it comes to rest to clamp the blank against the elongated plate 115 to hold the blank in registered position with relation to the folding and pressing mechanism. The mechanism 26 further includes a rockingly mounted tucking member indicated generally at 254 arranged to engage the forward edge of the three-section portion 138 of the blank to effect folding of the section to provide the two-ply band. Also associated with mechanism 26 is a transversely extended and vertically reciprocable press bar 255.

Each clamping member 252 includes a vertically reciprocable rod 256 which may be rubber tipped, as indicated, and which is slidingly mounted in a bearing block 258 secured to a bracket 260 attached to an upper frame member 262 supported by spaced side frames 263. The upper end of each rod 256 is connected by a link 264 to an arm 266 fast on a rocker shaft 268. A second arm 270 fast on the rocker shaft is connected by a link 272 to an intermediate portion of cam lever 274 mounted to rock on a shaft 276, the outer end of the lever being provided with a cam roll 278 for cooperation with a cam 280 fast on the cam shaft 68. In operation, when the blank comes to rest at station 26, the clamping members 252 are lowered to prevent displacement of the blank during the folding operation, and upon completion of the folding and pressing operation, the clamping members are elevated to release the blank.

The tucking member indicated generally at 254 includes an elongated angle member extended between blocks 282 pivotally carried at the lower ends of spaced rocker arms 284 which are pivoted at their upper ends on a shaft 286 journaled in brackets 288 depending from the upper frame member 262. The vertical leg 290 of the angle member is secured to the blocks 282 and the horizontal leg 292 comprises a tucking blade extending from the adjacent faces of the blocks and disposed a short distance upwardly from the bottom of the blocks to provide an edge engaging suurface 294 below and at right angles to the underside of the blade. A parallel link 296 pivotally mounted on a shaft 298 also journaled in the brackets 288 is pivotally connected at its lower end to an arm 300 attached to the vertical leg 290 of the angle member, the arm 300 also having an edge engaging surface 294.

Figure 6:
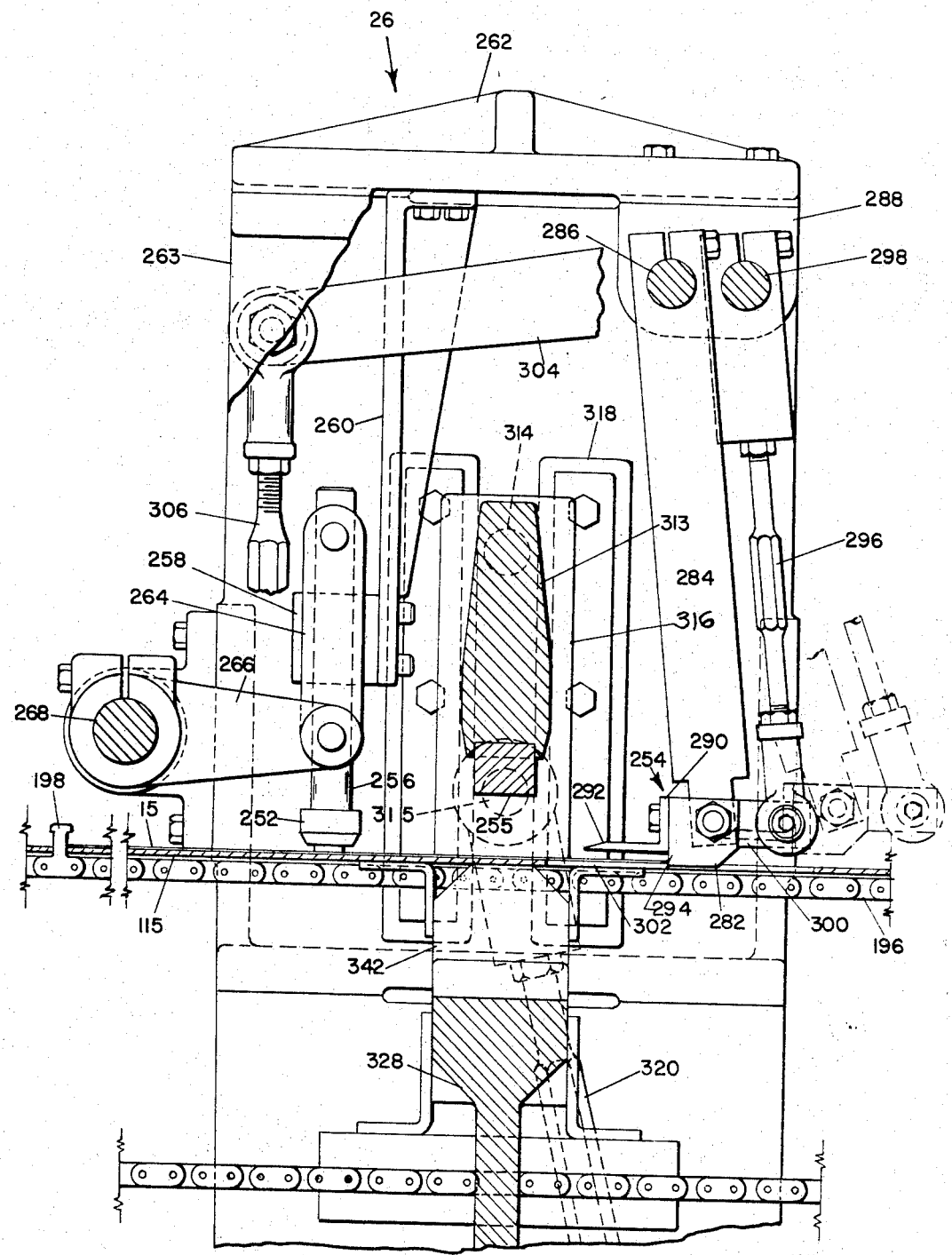
FIG. 6 is a side elevation of carton blank folding and pressing mechanism shown in FIG. 1A, some of the parts being shown in cross section.
Figure 7:
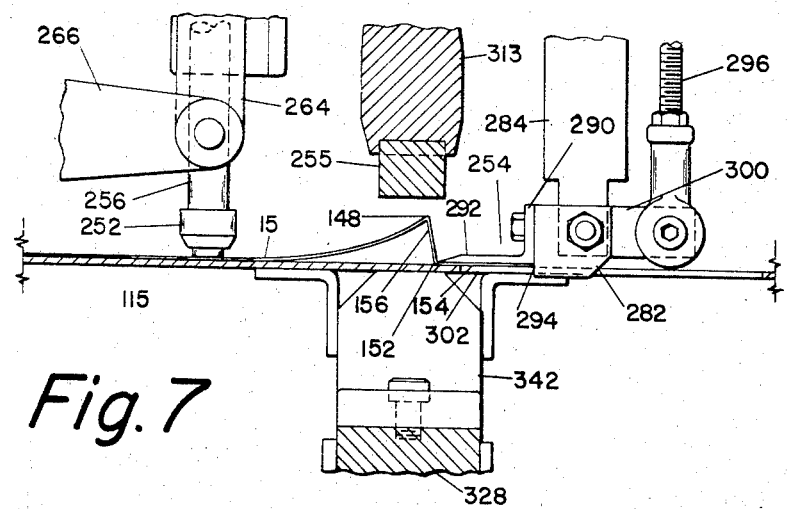
FIGS. 7, 8 and 9 are detail views partly in cross section illustrating different stages of the folding and pressing sequence.
Figure 8:
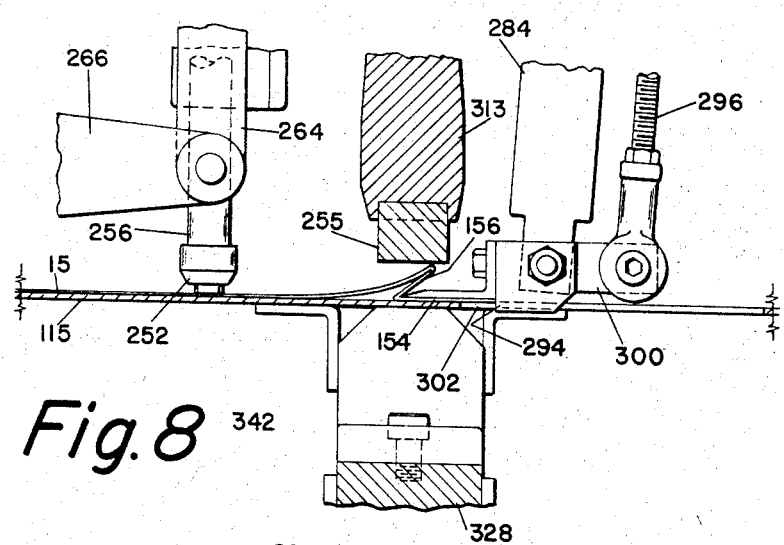
Figure 9:
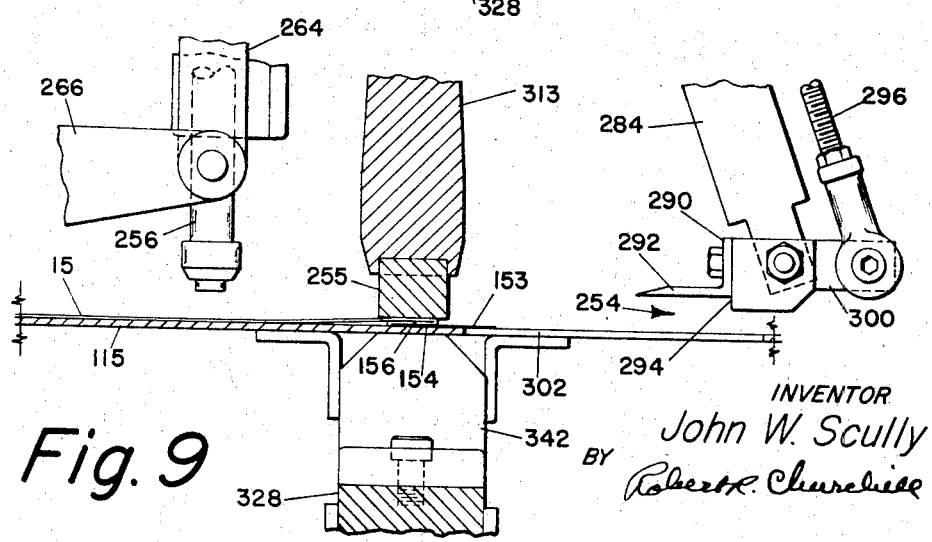

The folding and pressing sequence is illustrated in FIGS. 6 to 9 wherein the tucking member 254 is rocked from its extreme outward position, as shown in dotted lines in FIG. 6, to its extreme inward position, as shown in full lines in FIG. 8. Intermediate positions of the tucking member are shown in full lines in FIGS. 6 and 7 wherein the tucking member in FIG. 6 is disposed in a position where the blade 292 overlies the transverse sections 153, 154 of the three-section portion 138, and the edge engaging surfaces 294 are in engagement with the leading edges of the flaps 158, 160, 162 of the transverse section 153. It will be observed that in the position shown in FIG. 6, the underside of the blade 292 engages the upper surfaces of the transverse sections 153, 154 to hold them flat against the blank supporting plate 115, and the edge engaging portions 294 of the blocks extend below the underside of the blank, cutouts 302 being provided in the plate 115 to provide clearance for the blocks as they are rocked to perform the folding operation. In FIG. 7, the tucking member is shown in a position wherein the blank is partially folded along the lines 148, 152, the unclamped portion of the blank body being lifted up, as shown, and presenting the adhesively coated transverse section 156 in a substantially upright position. As previously described, the weakened line 148 is provided with elongated slits leaving relatively small frangible connecting portions 149 while the line 152 comprises a conventional scored line. Thus, when endwise pressure is applied to the edge of the three-section cover forming portion, the line 148 offers the least resistance to folding. As illustrated, when the blank bends along the line 148, it causes upward displacement of the unclamped portion of the body of the carbon blank. Since the transverse sections 153, 154 are being held down against the plate 115 with the front of the blade 292 adjacent the transverse score line 152, continued movement of the tucking member 254 will effect folding along the line 152 to present the transverse section 156 under the adjacent portion of the body of the blank and to present the transverse section 154 under the adhesively coated portion of section 156 as shown in FIG. 8. At this time, the press bar 255 is brought down into engagement with the partially completed fold and the blade 292 starts its withdrawal movement so as to prevent the adhesive coating on the transverse section 156 from being wiped onto the blade. It will be seen that the blade 292 is beveled at its leading end so as to avoid contact with the adhesive coated areas. Initial engagement of the press bar with the fold prevents it from unfolding during retraction of the tucking blade. The press bar then continues its downward movement to set the fold and to press the adhesive coated section 156 against the underlying folded section 154 as shown in FIG. 9.

Figure 11:
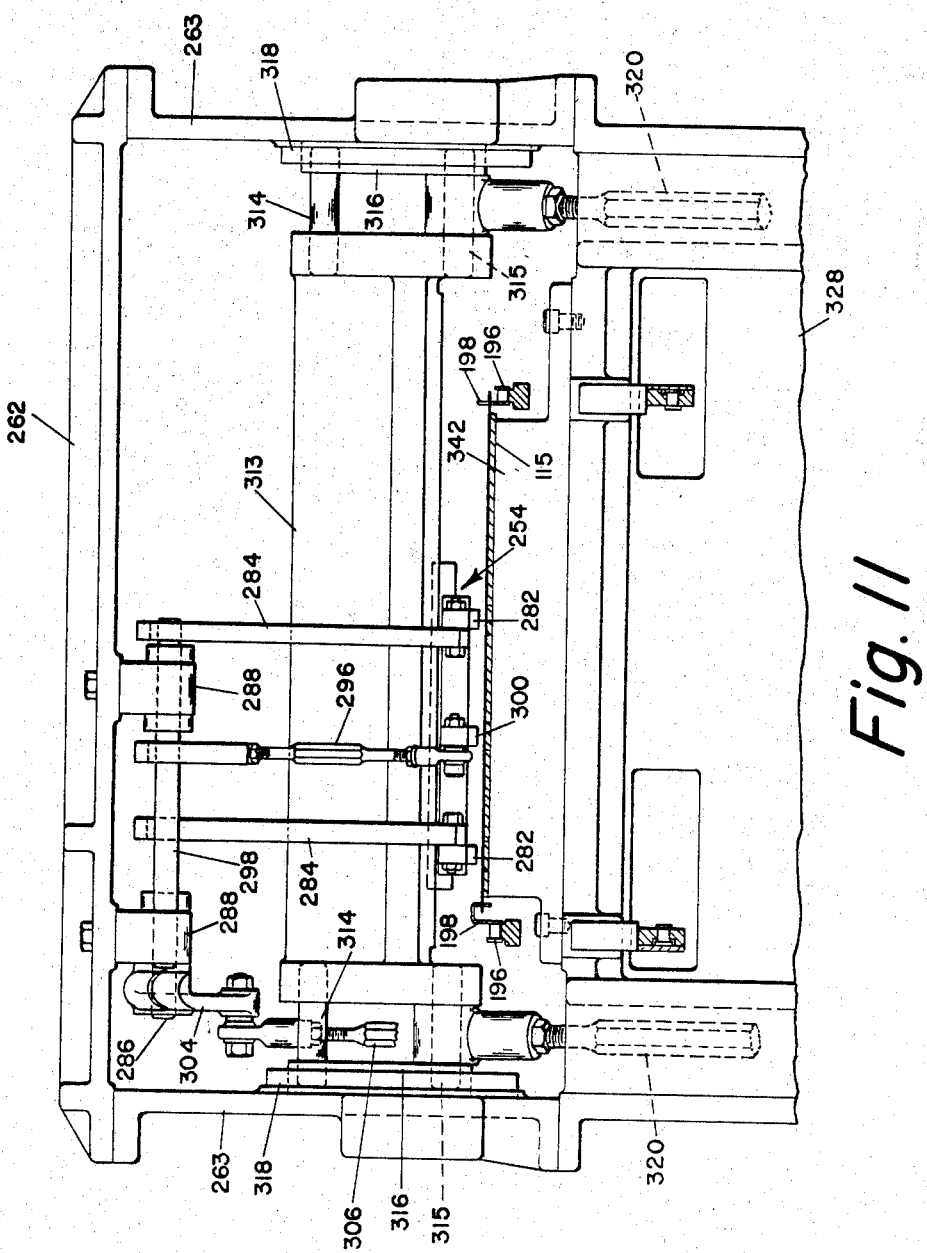
FIG. 11 is a vertical section taken on the line 11—11 of FIG. 1A.

As shown in FIGS. 1A, 6 and 11, the tucking member 254 is arranged to be rocked by linkage including an arm 304 fast on the shaft 286, the arm being connected by a link 306 to an intermediate portion of a cam lever 308 pivotally mounted on the shaft 276, the outer end of the lever having a roll 310 for cooperation with a cam 312 fast on the cam shaft 68.

The transverse pressing bar 255 is carried by an elongated transversely extended holder 313 which is provided with upper and lower pins 314, 315, respectively, extended laterally from each end thereof and which extend into opposed slide members 316 guided for vertical movement in brackets 318 secured to the side frames 263. The lower pins 315 are connected by links 320 to similar arms 322 fast on opposite ends of a shaft 324 journaled in brackets 326 attached to a tie piece 328 extending between side frame members 330. Also fast on the shaft 324 is an arm 332 connected by a yieldable link 334 to a cam lever 336 mounted to rock on the shaft 276. The lever 336 is provided with a roll 338 for cooperation with a cam 340 fast on the cam shaft 68. Each of the cam levers 274, 308, 336 may be provided with a spring for holding their cam rolls against their respective cams. As illustrated in FIG. 6, a supporting block or anvil 342 attached to the upper end of the tie piece 328 engages the underside of the blank supporting plate 115 to counteract the pressure of the bar 255 during the pressing operation.

Figure 10:
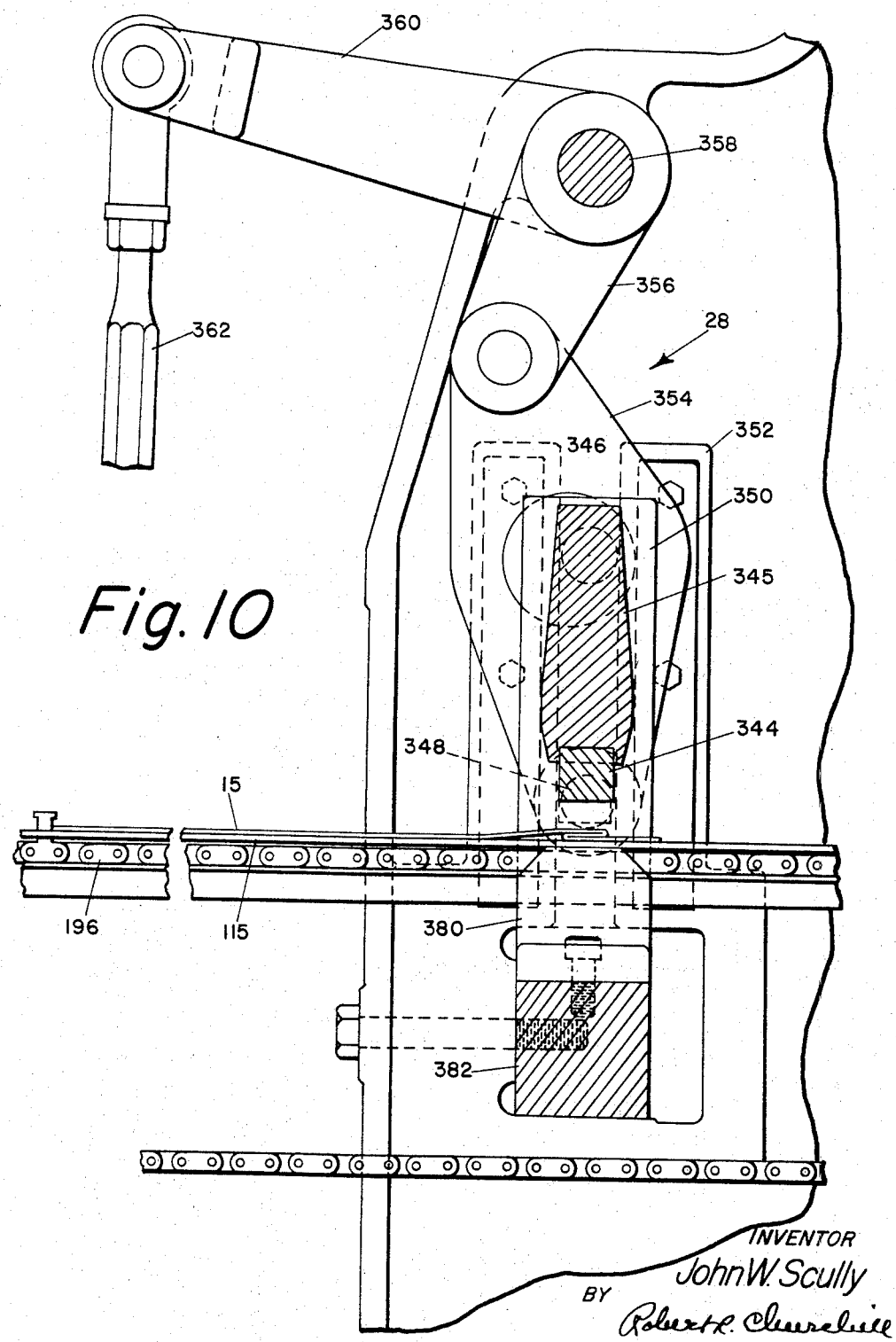
FIG. 10 is a side elevation of a second pressing mechanism shown in FIG. 1A, some of the parts being shown in cross section.
Figure 12:
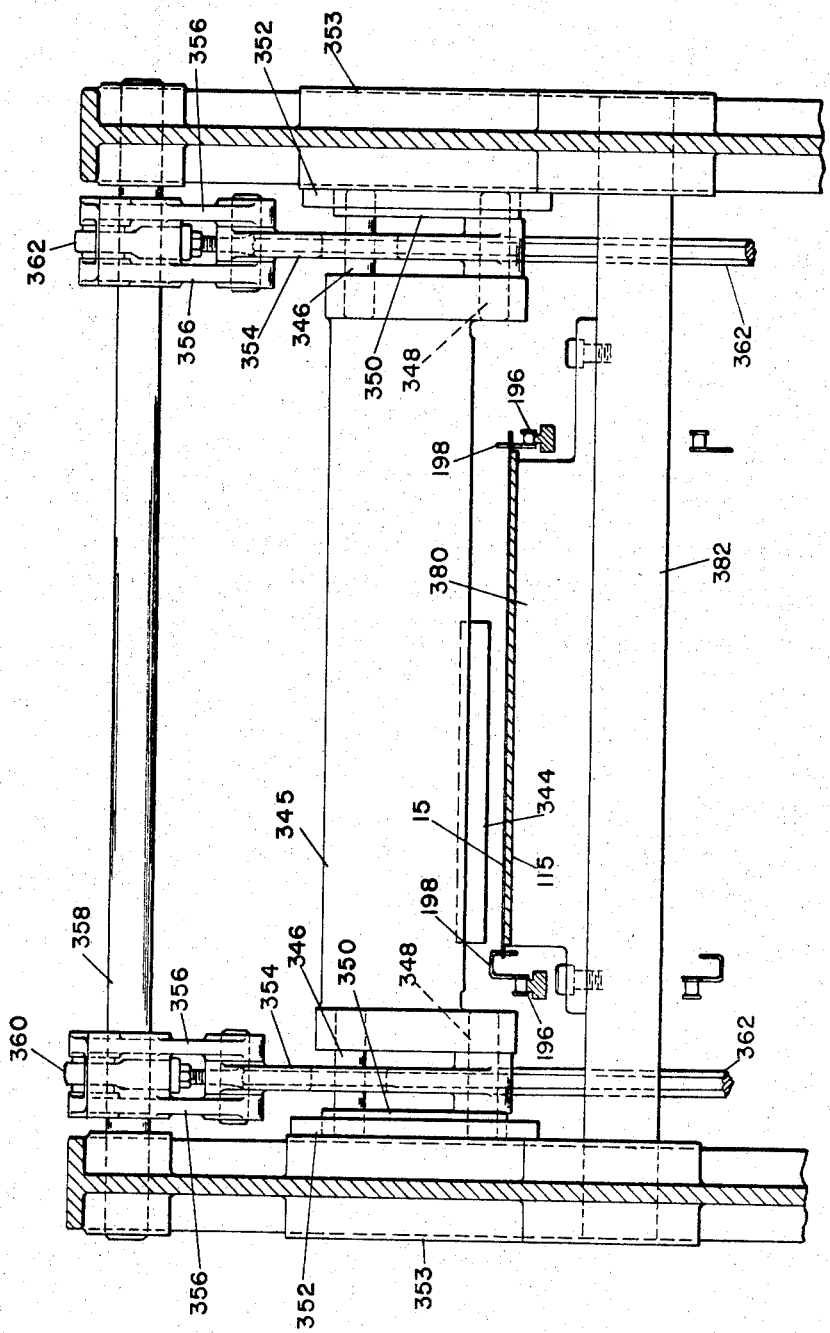
FIG. 12 is a vertical section taken on the line 12—12 of FIG. 1A.

From the description thus far, it will be seen that the flat blank transferred from a stack thereof onto a continuously moving conveyer 20 is provided with adhesive at selected areas thereof, and the blank is then transferred to an intermittently operated conveyer 24 where it is folded transversely along weakened and scored lines to provide the two ply band 157 in the subsequently formed hinged cover portion. After the folding and pressing operation the blank is intermittently moved to the second pressing station 28 to firmly set the adhesive between the folded sections 154, 156. The second pressing mechanism 28 may be similar to the first pressing mechanism and, as shown in FIGS. 1A, 10 and 12, the second pressing mechanism also comprises a vertically reciprocable press bar 344 carried by an elongated and transversely extended holder 345 which is also provided with upper and lower pins 346, 348 extended laterally from each end thereof and which are connected to slide members 350 guided for vertical movement in brackets 352 secured to side frames 353. The second pressing mechanism is provided with links 354 connected to the lower pins 348 at each end of the press bar. The links 354 are connected at their upper ends to arms 356 of bell cranks fast on an upper shaft 358 journaled in the side frames. The second arms 360 of the bell cranks are connected by links 362 to arms 364 fast on a lower shaft 366 journaled in brackets 368 attached to the frame. An arm 370 also fast on the shaft 366 is connected by a yieldable link 372 to a cam lever 374 pivotally mounted on the shaft 276. The lever 374 also carries a roll 376 for cooperation with a cam 378 fast on the cam shaft 68.

In operation, when the blank comes to rest at the second press station 28, the press bar 344 is lowered to perform the pressing operation. Station 28 is also provided with a supporting block or anvil 380 attached to a tie piece 382, the upper surface of the anvil engaging the underside of the supporting plate 115 to counteract the pressure applied by the bar 344. Upon elevation of the press bar the prepared blank is next advanced to transfer the blank from the conveyor 24 onto the elevating platform 30 in timed relation to the arrival of an intermittently operated forming block 10, the blank coming to rest against stops 384 to present the blank in registered relation to the folding mechanism for wrapping the blank about three sides of the forming block as shown in FIGS. 1A and 2A.

Figure 4:
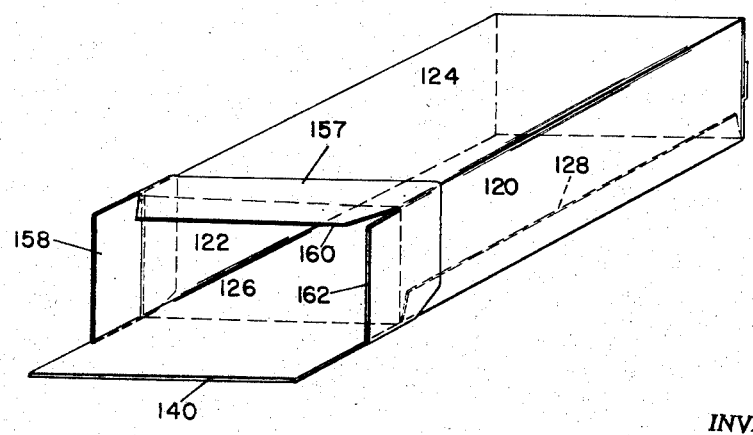
FIG. 4 is a perspective view of an open mouth carton as produced on the present machine.

The mechanism for folding the carton blank about the forming block 10 to form a rectangular carton may comprise the folding mechanism illustrated and described in the United States Patent to Vergobbi, No. 2,533,642, and includes a vertically reciprocable elevating plate 386 which engages the bottom of the block, and vertically reciprocable side plates 388 arranged to be elevated simultaneously with the plate 386 until the latter engages the bottom of the block, the side folding plates continuing upwardly to fold the blank against the sides of the block. The portions of the blank extending above the top of the block are then folded into overlapping relation against the upper surface of the block by folder plates, not shown, and when the folder plates are retracted a seam presser 390 is lowered into engagement with the seam to set the adhesive, thus forming a tubular carton about the block. Thereafter, the elevating plate 386 and the side folder plates 388 are lowered and the forming block is intermittently moved to a succeeding station of operation, not shown, where the extended bottom flaps of the carton are folded into overlapping relation and adhesively secured to form the bottom closures for the carton in the usual manner. The carton may then be stripped from the block and turned upright ready to be filled. The carton as produced on the present machine is shown in FIG. 4.

Figure 15:
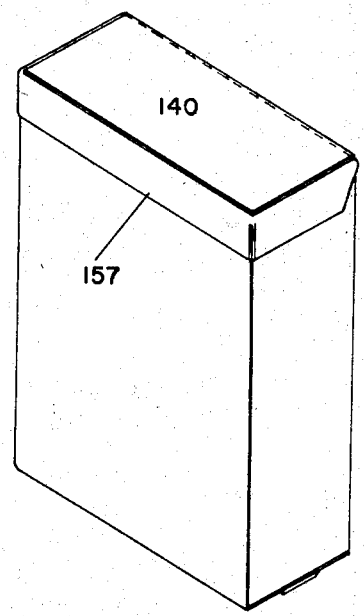
FIG. 15 is a perspective view of the upper portion of a filled and closed carton provided with a hinged top closure.
Figure 16:
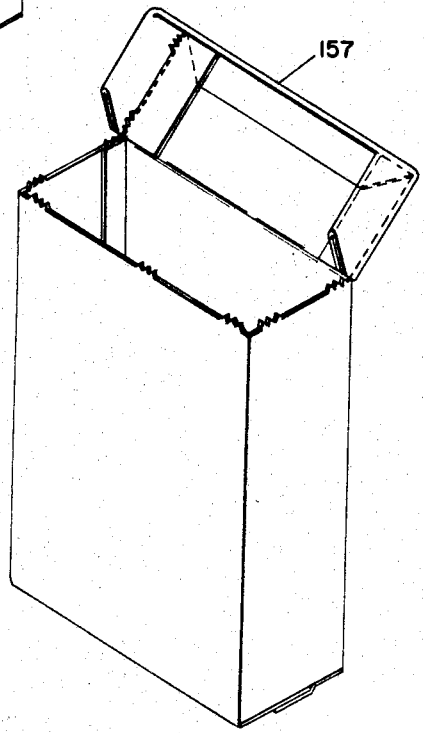
FIG. 16 is a view similar to FIG. 15 showing the hinged top closure in its opened condition.

After the filling operation, the mouth of the lining bag is closed and sealed and thereafter provision is made for folding and adhesively securing the extended flaps 140, 158, 160 and 162 to provide the hinged top closure shown in FIGS. 15 and 16, such top closure being illustrated and described in the Vergobbi Patent No. 3,282,-492, above referred to. It will be understood that these operations are performed in subsequent machines of a line of packaging machines wherein the top closing flap 140 is first provided with a coating of adhesive. The upstanding flaps 158, 160, 162 are then folded inwardly whereupon the side flap 140 is folded down on top of the underlying flaps and sealed thereto to produce the hinged top closure shown in FIG. 15. In the completed carton the top closure is hingedly secured to the body of the carton and the two ply band 157 extending around three sides of the carton are free of adhesive connection to the body, the band being connected to the body by the frangible portions 149 only of the weakened line 148. To open the carton, it is merely necessary to pull upwardly against the lower front edge of the carton with sufficient force to break the frangible connections 149 whereupon the closure will swing back on its hinged score line as shown in FIG. 16.

From the above description, it will be seen that the present packaging machine is particularly adapted to produce a carton having a top closing formation adapted to provide a hinged top closure in the completed carton.

While the preferred embodiment of the invention has been herein illustrated and described, it will be understood that the invention may be embodied in other forms within the scope of the following claims.

Having thus described the invention, what is claimed is:

1. In a carton forming machine for morming a rectangular carton, in combination, means for wrapping about a forming block a pre-scored carton blank having a body portion, bottom closing flaps, and top closing extensions provided with scored lines adapted to provide a hinged top closure, an intermittently operated conveyer for advancing the blank into operative relation to be wrapped about said forming block, and means cooperating with said conveyer for folding portions of the top closing extensions along scored lines defining transverse sections whereby to provide a two-play band adapted to form a part of the subsequently formed top closure.

2. A carton forming machine as defined in claim 1 wherein the folding means includes means for preventing displacement of the blank on the conveyer during the folding operation, a tucker blade movable to engage the leading edges and the upper surfaces of the leading portions of said extensions to confine the same flat against the conveyer, continued movement of the tucker blade effetcing bending of an unconfined transverse section along said scored lines in a manner such as to lift an adjacent portion of the body and to fold the unconfined section under the body and over an adjacent transverse section.

3. A carton forming machine as defined in claim 2 wherein the folding means further includes a press bar engageable with the fold to set the same upon retraction of the tucker blade.

4. A carton forming machine as defined in claim 2 wherein the unconfined transverse section is provided with a coating of adhesive, and a press bar engageable with the fold to press the adhesive coated section against the adjacent transverse section upon retraction of the tucker blade.

5. A carton forming machine as defined in claim 2 wherein the free edge of said tucker blade is disposed adjacent one of the score lines along which said unconfined section is bent.

6. A carton forming machine as defined in claim 2 wherein the unconfined transverse section is provided with a coating of adhesive and wherein the tucker blade is provided with a beveled front edge disposed adjacent a score line along which said unconfined section is bent, said tucker blade terminating its movement prior to completion of the fold to avoid engagement with the adhesive coated surface, and a press bar engageable with the partially completed fold during retraction of said tucker member to prevent unfolding of the partial fold, continued movement of the press bar arranged to complete the fold and adhesively set the same.

7. A carton forming machine as defined in claim 2 wherein a press bar cooperates with said tucker blade to complete the fold upon retraction of the tucker blade, and a second press bar cooperating with said conveyer to further press and set the fold.

8. A carton forming machine as defined in claim 2 wherein the blank advancing means includes a second and continuously operated conveyer preceding and coextensive with said intermittently operated conveyor, and means cooperating with said continuously operated conveyer for applying adhesive to selected areas of the blank during continuous advancement thereof, successive blanks advanced by the continuously operated conveyer being transferred directly to said intermittently operated conveyer.

9. A carton forming machine as defined in claim 2 wherein an elevating platform provided with stops is arranged to support the blank in registered relation to be folded about the forming block, said intermittently operated conveyer arranged to transfer successive folded blanks directly onto said elevating platform against said stops.

10. A carton forming machine as defined in claim 2 wherein the intermittently driven conveyer is provided with drive means including a modified Geneva drive arranged to provide a harmonic advancing motion to the conveyer whereby to effect a smooth and substantially uniform advancing movement to the blanks.

11. A carton forming machine as defined in claim 10 wherein the modified Geneva drive comprises a driving element mounted for rotation and diametrical reciprocation and provided with a pair of opposed guide rollers, a stationary cam cooperating with said rollers to effect said diametrical reciprocation, a driven element provided with Geneva slots, and driving elements provided with a pair of opposed drive rollers for cooperation with said slots, said cam having a path arranged to guide the drive rollers harmonically through a propressively increasing and progressively decreasing radius relative to the center of the cam during engagement of the drive rollers with said slots.

12. In a carton forming machine of the character described, in combination, means for supporting and clamping a prescored carton blank having a body portion, bottom closing flaps, and top closing extensions scored to provide a two-ply band in the blank, and means for folding said extensions along scored lines defining a transverse section, said folding means comprising a tucker blade movable to engage the leading edges and the upper surfaces of the leading portion of said extensions to confine the same flat against the support leaving said transverse section unconfined, continued movement of the tucker blade effecting bending of the section along said scored lines in a manner such as to lift an adjacent portion of the body and to fold the section under the body and over an adjacent transverse section, and a press bar engageable with the fold to retain the same during retraction of the press bar and movable to complete and set the fold.

References Cited

UNITED STATES PATENTS

| 3,021,768 | 2/1962 | Graulig et al. | 93—49 XR |
| 3,068,761 | 12/1962 | Engleson et al. | 93—49 |

BERNARD STICKNEY, *Primary Examiner.*